US008523522B1

(12) United States Patent
Vanderhye (10) Patent No.: US 8,523,522 B1
(45) Date of Patent: Sep. 3, 2013

(54) VERTICAL AXIS WIND TURBINE ROTATING DESIGN ELEMENTS

(76) Inventor: Robert A. Vanderhye, McLean, VA (US)

(*) Notice: Subject to any disclaimer, the term of this patent is extended or adjusted under 35 U.S.C. 154(b) by 1816 days.

(21) Appl. No.: 11/703,635

(22) Filed: Feb. 8, 2007

Related U.S. Application Data

(60) Provisional application No. 60/781,342, filed on Mar. 13, 2006, provisional application No. 60/796,542, filed on May 2, 2006.

(51) Int. Cl.
*F03D 3/06* (2006.01)
*F03D 3/00* (2006.01)
*G09F 7/22* (2006.01)

(52) U.S. Cl.
USPC ........ 416/61; 416/62; 416/146 R; 416/197 A; 40/440; 40/479; 40/493

(58) Field of Classification Search
USPC .................. 415/118; 40/440, 473, 479, 484; 416/61, 62; 353/7, 10, 108; 352/2, 98, 102; 359/1, 458, 462
See application file for complete search history.

(56) References Cited

U.S. PATENT DOCUMENTS

| | | | |
|---|---|---|---|
| 1,697,574 A | | 1/1929 | Savonius |
| 1,925,136 A | * | 9/1933 | Conover ........................ 352/101 |
| 1,945,789 A | * | 2/1934 | Revis .............................. 352/98 |
| 2,069,103 A | * | 1/1937 | Bestler ............................ 40/431 |
| 2,587,620 A | | 3/1952 | Hormann |
| 2,677,344 A | | 5/1954 | Annis |
| 2,985,976 A | * | 5/1961 | Parker ............................ 40/440 |
| 4,353,179 A | * | 10/1982 | Jennings ......................... 40/479 |
| 4,359,311 A | * | 11/1982 | Benesh ....................... 416/197 A |
| 4,470,044 A | | 9/1984 | Bell |
| 4,500,259 A | | 2/1985 | Schumacher |

(Continued)

OTHER PUBLICATIONS

Rensselaer School of Engineering; www.eng.rpi.edu/soenews; "Winding Upward with Corks and Turbines" Sep. 20, 2003.

(Continued)

*Primary Examiner* — Edward Look
*Assistant Examiner* — Jesse Prager (57) ABSTRACT

A functional rotor, desirably but not necessarily a Savonius, helical, or other vertical axis wind turbine rotor, has other functions in addition to driving a useful driven mechanism (such as an electricity or hydrogen generator, pump, etc.). The rotor has exterior rotating surface areas and at least one of design, aesthetic, holographic, reflective, and informational elements on those areas that create the illusion of movement distinct from the rotation of the rotor itself. The elements may be substantially vertical holographic material or reflective material stripes alternating with non-holographic or non-reflective stripes, or at least one of design and aesthetic elements disposed to create a spiral movement illusion. The elements may be selected and positioned so that a message or design is completed in the viewer's eye only upon rotation of the surface areas. The rotor may simulate a praxinoscope, phenakistascope, or zoetrope. A Savonius VAWT may be provided having a rotor with vanes having relatively large, uninterrupted exterior surface areas, a covering for at least one of the exterior surface areas, and removable attachment elements which operatively removably connect the covering to at least one exterior surface area. The removable attachment elements may comprise cooperating hook and loop fasteners on the covering and the vane exterior surface area, or cooperating permanent magnets or magnetic material. A number of different messages may be provided on the surface areas, each primarily visible at a different speed of rotation of the vanes than the others.

8 Claims, 5 Drawing Sheets

(56) References Cited

U.S. PATENT DOCUMENTS

| | | | |
|---|---|---|---|
| 5,355,600 A | | 10/1994 | Thompson |
| 5,415,451 A | * | 5/1995 | Stanton ............................ 296/21 |
| 5,870,170 A | | 2/1999 | Pope |
| 6,018,899 A | * | 2/2000 | Hanitz ............................ 40/473 |
| 6,286,873 B1 | | 9/2001 | Seder |
| 6,363,637 B1 | | 4/2002 | Birmingham |
| 6,428,275 B1 | | 8/2002 | Jaakkola |
| 6,465,899 B2 | * | 10/2002 | Roberts ............................ 290/44 |
| 6,524,073 B2 | | 2/2003 | Maatsakanian |
| 6,602,045 B2 | | 8/2003 | Hickey |
| 6,772,707 B1 | * | 8/2004 | Williamson ................. 116/63 P |
| 2004/0130783 A1 | | 7/2004 | Solomon |
| 2004/0216339 A1 | * | 11/2004 | Garberg et al. ................. 40/308 |
| 2005/0042100 A1 | * | 2/2005 | Wobben .................... 416/132 B |

OTHER PUBLICATIONS

The Disney Gallery; www.waltdisneygallery.net; description of Zoetrope and Praxinoscope; admitted prior art.

\* cited by examiner

VERTICAL AXIS WIND TURBINE ROTATING DESIGN ELEMENTS

CROSS REFERENCE TO RELATED APPLICATIONS

This application claims the benefit of and incorporates by reference provisional application Ser. No. 60/781,342 filed Mar. 13, 2006 and provisional application Ser. No. 60/796,542 filed May 2, 2006, both of which in turn incorporate by reference provisional Ser. No. 60/756,233 filed Jan. 5, 2006.

BACKGROUND & SUMMARY OF THE INVENTION

In co-pending U.S. application Ser. No. 10/854,280 filed May 27, 2004 and Ser. No. 11/265,278 filed Nov. 3, 2005, Savonius type vertical axis wind turbines (VAWT) are illustrated and described which are considered by many viewers to be aesthetically superior to most other wind turbine designs. As such, and in view of the advantages of VAWTs for many environmental reasons, such VAWTs can be sited in many locations where other wind turbines would not be sited, including many locations close to relatively densely populated or high traffic areas. Taking advantage of such siting capabilities, according to the invention the aesthetic Savonius type VAWT as described in the co-pending applications may be modified to perform functions in addition to simply producing work from the action of the wind.

According to one aspect of the present invention the rotating surface areas of functional, operational VAWTs (which typically generate electricity but may produce a fuel gas, pump liquids, etc.), particularly of the Savonius general type, or the helical general type, are designed in such a way that they provide informational or aesthetic or design elements to a viewer. This may be accomplished by providing advertising on the rotating surface areas, with each distinct surface area providing part of an advertising message or design that is completed in the viewer's eye upon rotation of the surface areas; or by providing any other design elements that are completed in the viewer's eye upon rotation of the surface areas. Alternatively, reflective, holographic, refractive, or other aesthetic or design elements that do not require completion by the viewer's eye, may be provided.

In general, according to this later aspect of the invention there is provided a functional Savonius or helical vertical-axis wind turbine rotor operatively connected to a useful driven mechanism, and having rotating surface areas; and at least one of design, aesthetic, holographic, reflective, and informational elements on the surface areas that create the illusion of movement distinct from the rotation of the rotor itself. The elements may comprise substantially vertical holographic material or reflective material stripes alternating with non-holographic or non-reflective stripes; or the elements may comprise design or aesthetic elements disposed to create a spiral movement illusion. In addition to the design or aesthetic elements informational elements, including at least one word, may be provided, the entirety of the words visible only during rotation of the rotor. The rotating surface areas are desirably, but not necessarily, surface areas of vanes of a three vane Savonius vertical axis wind turbine.

Alternatively, the rotor may simulate a praxinoscope, phenakistascope, or zoetrope. For example if the rotor simulates a zoetrope, the rotor includes a substantially central shaft with mirrors; the rotating surface areas are surface areas of vanes of a Savonius vertical axis wind turbine having at least portions thereof that are transparent and other portions that are opaque, and interior portions having at least one of design, informational, and aesthetic elements; and the mirrors, transparent surface areas, and elements, are positioned so that the elements are at least partially visible from the exterior of the rotor during rotation thereof.

Where the rotor is a rotor of a Savonius vertical axis wind turbine having at least two vanes, the surface areas may be coverings for exterior surfaces of the Savonius rotor vanes. The coverings are operatively connected by removable attachment elements to the vane exterior surfaces. The removable attachment elements may be selected from the groups consisting essentially of: cooperating hook and loop fasteners on the covering and the vane exterior surface area; and cooperating permanent magnets or magnetic material on the covering and the vane exterior surface area.

According to another aspect of the invention there is provided a functional rotor (not necessarily rotatable about a vertical axis) having a plurality of rotating surface areas, and operatively connected to a useful driven mechanism; and at least one of design, aesthetic, holographic, reflective, and informational elements on the surface areas. The elements are selected and positioned so that a message or design is completed in the viewer's eye only upon rotation of the surface areas.

According to still another aspect of the invention, there is provided a Savonius VAWT having a rotor with vanes having relatively large, uninterrupted exterior surface areas, and a plurality of messages on the surface areas each primarily visible at a different speed of rotation of the vanes than the others. Desirably, the rotor is a three bladed (vane) Savonius rotor, and may have at least three different messages.

According to yet another aspect of the invention, there is provided Savonius VAWT having a rotor with vanes having relatively large, uninterrupted exterior surface areas; a covering for at least one of the exterior surface areas; and removable attachment elements which operatively removably connect the covering to at least one exterior surface area. The removable attachment elements may comprise cooperating hook and loop fasteners on the covering and the vane exterior surface area; and/or the removable attachment elements may comprise cooperating permanent magnets or magnetic material on the covering and the vane exterior surface area. Desirably, the rotor has at least two vanes, and all of the vanes are provided with coverings removably attached thereto, the coverings each having a vastly different appearance than the appearance of the vane exterior surface areas.

It is the primary object of the present invention to provide a multi-function and/or multiple aesthetic look vertical axis wind turbine. This and other objects of the invention will become clear from the detailed description of the invention, and from the appended claims.

DETAILED DESCRIPTION OF THE DRAWINGS

FIGS. 1-8 show several different embodiments of a mechanism according to the present invention that provides multiple functions. The purpose of the FIGS. 1-8 embodiments is to use an otherwise fully operational (e.g. for producing electricity or a fuel gas [such as hydrogen]; or for pumping liquids such as water) VAWT to provide aesthetic or design elements, or to transmit information, or the like. Such a VAWT then performs at least a dual function. Further, in many situations where a wind turbine of any type might be felt unaesthetic, that feeling may be at least partially (if not fully) mitigated according to this aspect of the invention. According to this aspect, design, aesthetic, holographic, reflective, or informational elements are provided on the surface areas of the rotor vanes that create an illusion of movement distinct from the rotation of the rotor itself.

Figure 1:
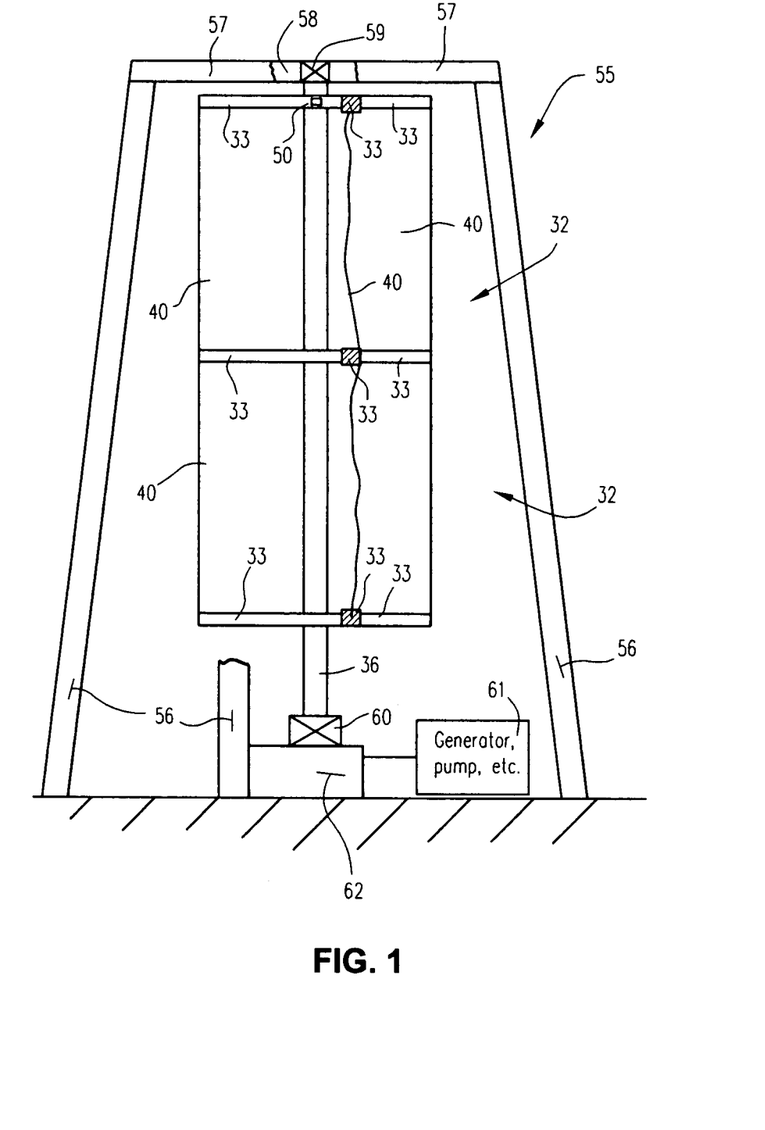
FIG. 1 is a side schematic view of a fully functional three bladed Savonius wind turbine which uses aesthetic, informational, and/or design elements.

FIG. 1 is substantially the same as FIG. 5 of the '278 application, showing a fully functional three bladed Savonius wind turbine rotor 32, with ribs 33 supporting vanes 40. The rotor 32 preferably includes a substantially vertical shaft 36 which mounts the ribs 33, and which in turn is mounted for rotation about a substantially vertical axis by bearings 59, 60. The bearing 59 is supported by a tower 55 having legs 56, top cross pieces 57, and central hub 58. The vanes 40 provide rotating exterior surface areas which are utilized for informational, design, or aesthetic display according to the invention. While the three bladed rotor of FIG. 1 is preferred, a conventional two bladed Savonius may be utilized, or between a two or four bladed either open or closed helical turbine, such as shown in U.S. Pat. Nos. 2,677,344 or 6,428,275.

Figure 2:
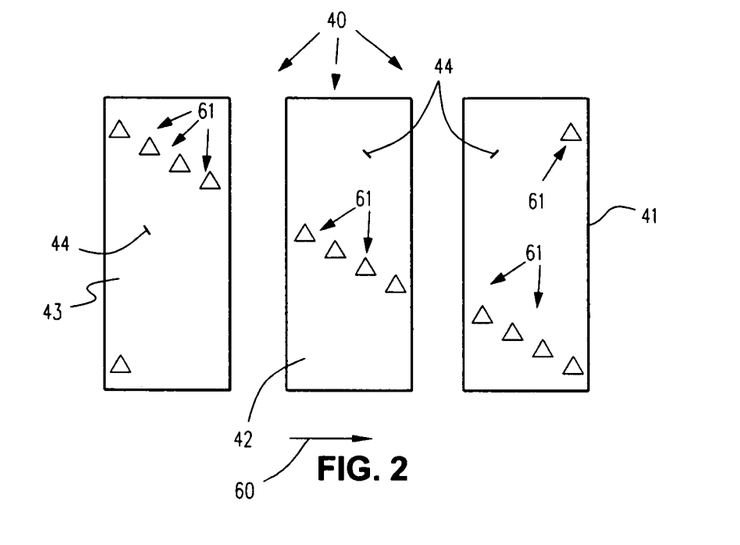
FIG. 2 is a schematic developed, exploded, view of three different consecutive vanes of a wind turbine like that of FIG. 1 with design elements completed by a viewer's eye.

FIG. 2 is a schematic developed, exploded, view of three different, consecutive, vanes 40 [numbered 41, 42 and 43 for convenience] of a Savonius turbine rotor 32, such as in FIG. 1, that has design elements that are completed by the viewer's eye upon rotation of the rotor 32 in response to wind (while generating electricity, pumping water, etc.). The vanes 40 move in the direction of arrow 60. On the exterior rotating surface 44 of each vane 41-43 are design elements 61. In this embodiment, as the vanes 40 move in direction 60 a viewer first sees the elements 61 on vane 41, then the elements 61 on vane 42, then the elements 61 on vane 43, the rightmost (as viewed in FIG. 2) of the elements 61 on each vane surface 44 coming into view first and disappearing last as the vanes 41-43 rotate in direction 60. The elements 61, when observed by a viewer while the surfaces 44 are rotating, give the effect of a continuous upward spiral movement (similar to the effect in a rotating conventional barber pole), an illusion of movement different from the rotation of the rotor 32 itself.

Figure 3:
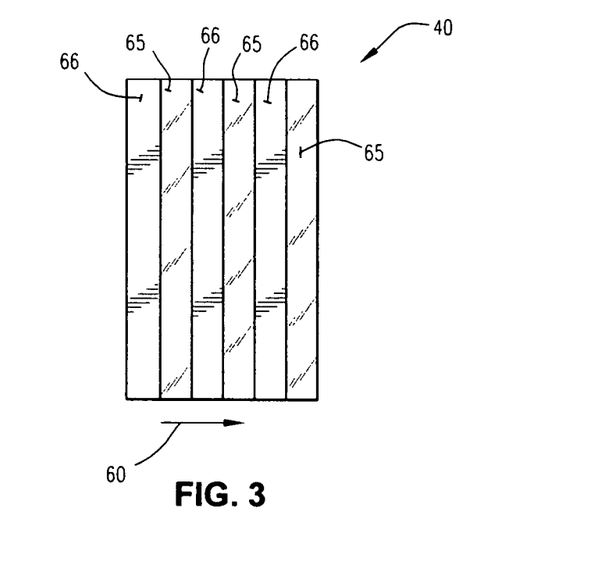
FIG. 3 is a side schematic view of just one turbine rotor, such as of the turbine of FIG. 1, which has holographic or reflective material thereon.

FIG. 3 shows just one vane 40 of a turbine rotor which has holographic or reflective material in stripes 65 along the surface 44 thereof, alternating with stripes 66 that are not holographic or reflective (e.g. with a matte finish). While the stripes 65, 66 are preferably substantially vertical (parallel to the axis of rotation), as illustrated in FIG. 3, they may be slanted, with the lower edge of each stripe 65, 66 leading (in the direction of rotation 60). The other vanes of the turbine would be similarly constructed. This provides an eye-catching aesthetic display, similar to the effect provided by the structure in U.S. Pat. No. 5,355,600 (the disclosure of which is hereby incorporated by reference herein).

Figure 4:
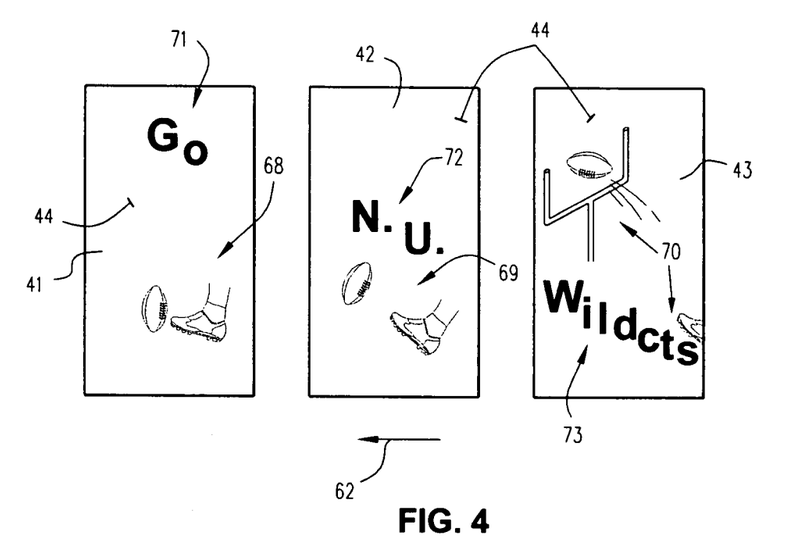
FIG. 4 is a view like that of FIG. 2 of rotor vanes with different design elements.

FIG. 4 is another schematic developed, exploded, view of three different, consecutive, vanes 40 [numbered 41-43] of a Savonius turbine rotor 32, such as in FIG. 1, that has design elements that are completed by the viewer's eye upon rotation of the rotor 32 in response to wind (while generating electricity, pumping water, etc.). In this embodiment a clockwise direction of rotation is shown, however, instead of a counter-clockwise direction. That is, the vanes 40 move in the direction of arrow 62.

On the exterior rotating surface 44 of each vane 41-43 in FIG. 4 are design elements 68, 69, 70 and/or symbols 71, 72, 73 which convey information. In this embodiment, as the vanes 40 move in direction 62 a viewer first sees the elements 68 and symbols 71 on vane 41, then the elements 69 and symbols 72 on vane 42, then the elements 79 and symbols 73 on vane 43, the leftmost of the elements and symbols (as viewed in FIG. 4) on each vane surface 44 coming into view first and disappearing last as the vanes 41-43 rotate clockwise (in direction 62). The elements and symbols when observed by a viewer while the surfaces 44 are rotating, transmit a message (such as the indicia "GO NU Wildcats" illustrated in FIG. 4) while providing the illusion of movement related to the message (the NU Wildcats football team scoring a field goal or extra point).

Figure 5:
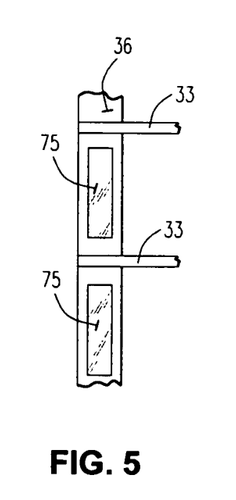
FIGS. 5-7 are schematic side view of different parts of a turbine rotor according to the invention comprising a mechanism similar to a conventional Zoetrope.
Figure 6:
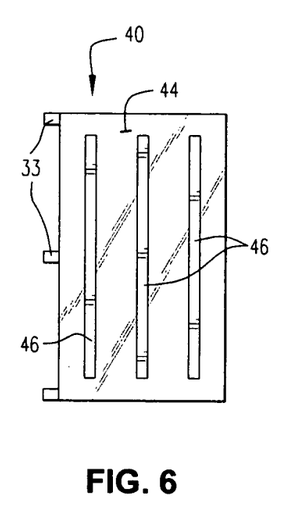
Figure 7:
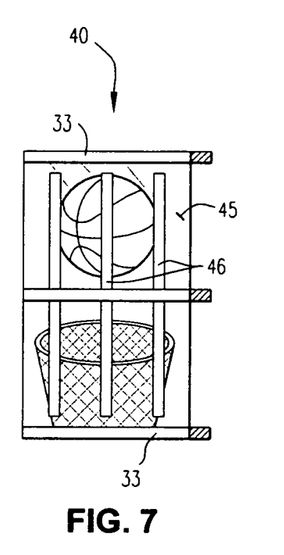

FIGS. 5-7 are side views of different parts of a turbine rotor according to the invention that comprises a mechanism similar to a conventional Zoetrope. FIG. 5 shows the shaft 36 of the rotor 32 with arms 33, and mirrors 75 (which may be separate structures, or highly polished and/or reflective surface portions of the shaft 36 exterior) operatively positioned on the shaft 36 exterior, in operative alignment with each vane 40.

FIG. 6 shows the exterior surface 44 of one of the vanes 40, with transparent strips 46 therein. The entire vane 40 can be of transparent material (e.g. polycarbonate), with the rest of the surface 44 except for the substantially vertical strips coated with a substantially opaque material (e.g. black paint) or otherwise rendered substantially opaque.

FIG. 7 shows the interior surface 45 of the vane 40, having design elements 77, 78 (a basketball and basketball hoop in the embodiment schematically illustrates) or symbols (including words). Different elements 77, 78 may be provided on the interior surfaces 45 of each of the vanes 40, or the same elements at the same or different locations (for example basketball 77 could move closer to or through hoop 78 on other surfaces 45). A viewer thus sees the images of the elements 77, 78 as reflected off the mirrors 75 through the transparent strips 46 as the vanes 40 rotate in response to the wind (e.g. to generate electricity, generate hydrogen by electrolysis of water or by mechanical means, pump water, etc.).

All of the aesthetic, design, holographic, reflective, and informational elements may be formed during manufacture of the vanes 40, applied thereto after manufacture using any suitable conventional technique (including, but not limited to, attachment by adhesive, or painting on), or otherwise provided. The examples of aesthetic, design, holographic, reflective, and informational elements of the schematic embodiments of FIGS. 1-7 are only representative examples, and other mechanisms may be used. For example devices simulating praxinoscopes or phenakistascopes may be utilized, or configurations or elements such as illustrated in U.S. Pat. Nos. 2,587,620, 4,470,044, 6,363,637 and 6,524,073, and published U.S. Patent Specification 2004/0130783 may be utilized (adapted to a vertical axis wind turbine). Also, while the embodiments illustrated have been versions of a three bladed Savonius turbine such as in the '278 application, other cylinder-simulating VAWTs may be utilized [including those in U.S. Pat. Nos. 2,677,344 or 6,428,275, mentioned above]. Also, under some circumstances the invention can be applied to turbines similar to the ones provided herein that are rotatable about substantially horizontal axes, or that are powered by a fluid other than wind (e.g. water); for example see the turbine rotors in U.S. Pat. Nos. 4,500,259 and 6,293,835.

Figure 8:
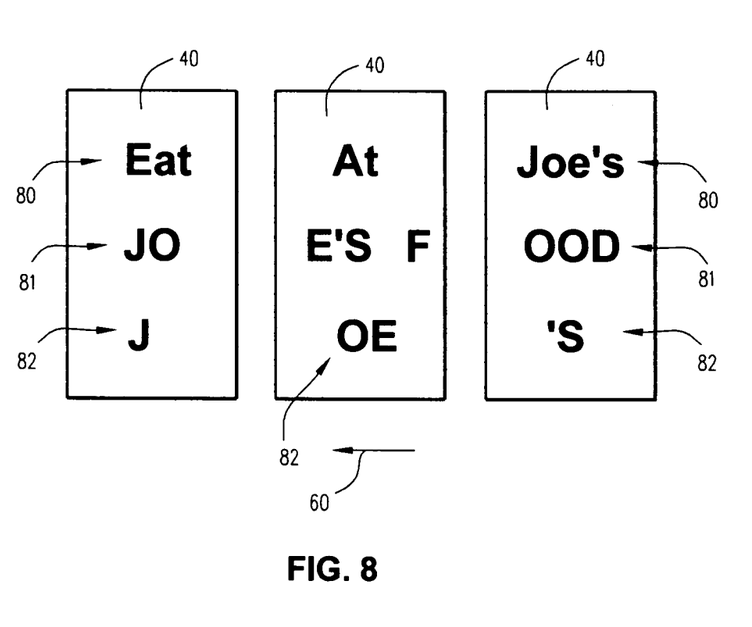
FIG. 8 shows an exploded schematic side view of three exterior surfaces of three consecutive vanes of a wind turbine like that of FIG. 1 having a plurality of different messages readily visible at different speeds of rotation.

FIG. 8 shows an exploded schematic view of three exterior surfaces of the three vanes 15 of a Savonius VAWT such as disclosed in U.S. application Ser. Nos. 11/265,278, 11/251,773, and 11/113,176, and similar to the FIGS. 2-4 embodiments. However, in this case the vanes 40 have a plurality of different messages thereon, readily visible at different speeds of rotation of the rotor 32 having the vanes 40, as the vanes move in the effective direction of movement (rotation) 60 seen in FIG. 8.

For example, at a slow speed of rotation a first message 80 is primarily visible. At a second, faster, speed of rotation a second message 81 is primarily visible while the vanes 40 move fast enough that the first message 80 is no longer easily read. At a third, still faster, speed of rotation a third message 82 is primarily visible, while the messages 80 and 81 are blurred or otherwise no longer easily read. Still more messages may be provided, if desired.

While in FIG. 8 the messages 80-82 are shown as word messages, they can be pictorial or artistic messages instead of, or in addition to, word messages.

The large, substantially un-interrupted, exterior surfaces of the vanes of the preferred Savonius VAWTs of U.S. application Ser. Nos. 11/265,278, 11/251,773, and 11/113,176, are especially well suited to providing messages or art such as in all of the embodiments of FIGS. 1-8.

Figure 9:
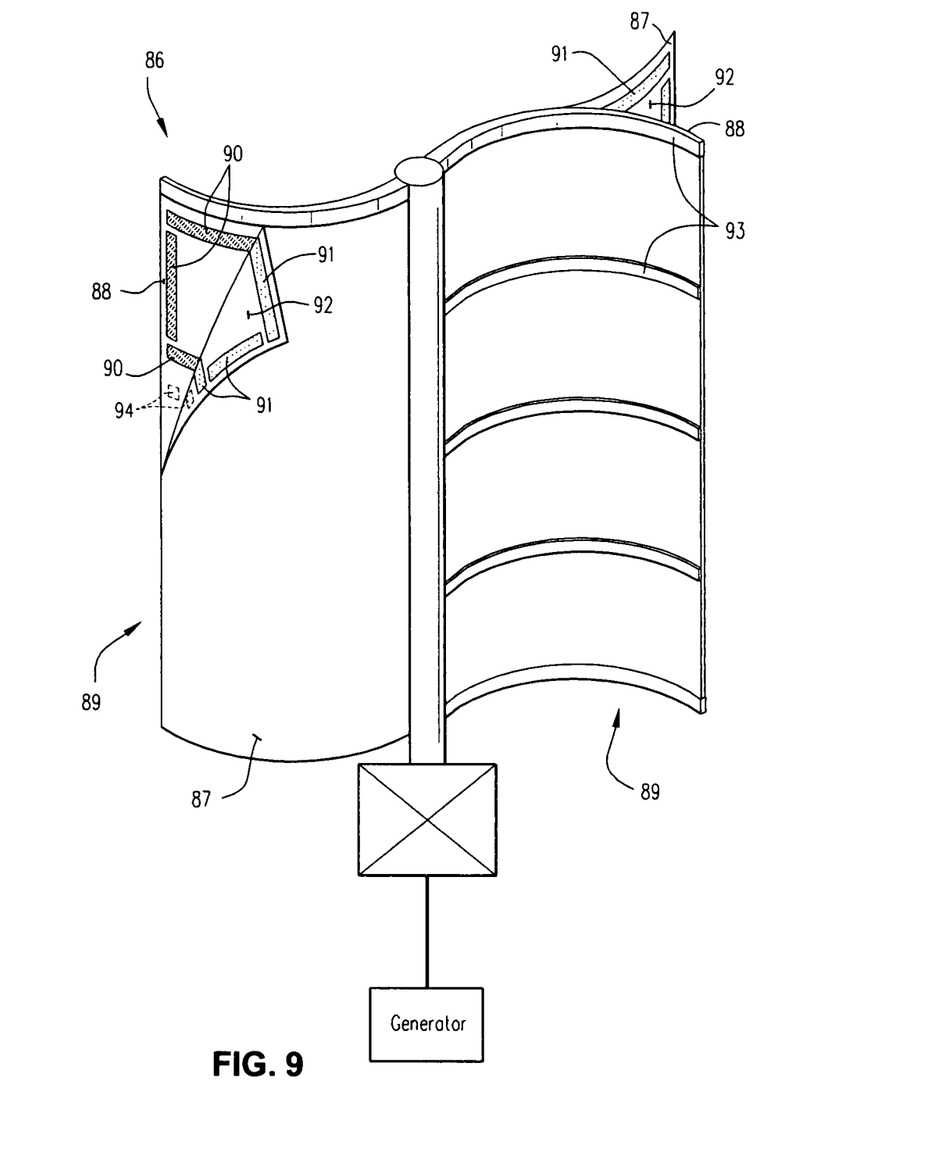
FIG. 9 is a schematic perspective view of a Savonius rotor according to the invention that has removable coverings of the exterior surfaces of the vanes thereof.

As illustrated by the further exemplary embodiment of FIG. 9, a Savonius rotor 86 according to the invention (in this case a two bladed one, although the invention is applicable to a Savonius with any number of blades, and especially a three bladed rotor) includes removable coverings 87 for the exterior (non-wind-engaging) surfaces 88 of the vanes 89 thereof. The configuration of the exemplary rotor 86 illustrated in FIG. 9 is like that in Ser. No. 11/113,176.

The removable coverings 87 allow the look of the rotor 86 to be varied widely, and typically the coverings have a vastly different appearance than the appearance of the vane exterior surface areas 88. For example, the exterior surfaces 88 may normally have a camouflage configuration, but in winter time the coverings 47 that are placed thereon are white, so that the rotor blends in with surrounding snow. Of course any type of message, art, color, or graphic may be provided on the surfaces 88 and coverings 87 depending upon the owner's desires, or the surroundings.

The coverings 87 may be made readily detachable by using removable attachment elements. For example, the removable attachment elements may comprise cooperating hook and loop (e.g. VELCRO®) fasteners 90, 91 on the exterior surface 88 of the rotor 86 and interior surface 92 of the covering 87, respectively. For example the fasteners 90 may be hook fasteners, and the fasteners 91 loop fasteners.

Other types of removable attachment elements (fasteners) may alternatively or in addition be provided, including strips or blocks of permanent magnetic or magnetic material fasteners [shown schematically in dotted line at 94 in FIG. 9], snaps, or the like. Also, the coverings 87 may at least partially wrap around at least some of the spoke ribs 93 supporting the vanes 89 (see co-pending U.S. Ser. No. 10/443,954 filed May 23, 2003). The coverings 87 may be cloth, bendable sheets of plastic or metal, or any other suitable material. A sturdy sailcloth is particularly desirable for the coverings 87, while the vanes 89 themselves are of aluminum, steel, polycarbonate, thicker sailcloth, or the like.

The term "operatively connected", "operatively disposed", or the like means, as it normally does, any connection or disposition that allows the device or mechanism to function as designed. All narrow ranges within any disclosed broad range are also specifically included herein. Also, the invention is to be accorded the broadest interpretation possible, consistent with the prior art.

What is claimed is:

1. A functional wind turbine rotor operatively connected to a pump or generator to drive the pump or generator in response to wind, and having rotating surface areas; and at least one of design, aesthetic, holographic, reflective, and informational elements on the surface areas that create the illusion of movement distinct from the rotation of the rotor itself in response to wind; and wherein said rotor includes a substantially central shaft with mirrors, and wherein said rotating surface areas are surface areas of vanes of a Savonius vertical axis wind turbine having at least portions thereof that are transparent and other portions that are opaque, and interior portions having at least one of design, informational, and aesthetic elements said mirrors, transparent surface areas, and elements positioned so that said elements are visible from the exterior of said rotor during rotation thereof.

2. A functional wind turbine rotor operatively connected to a pump or generator to drive the pump or generator in response to wind, and having rotating surface areas; and at least one of design, aesthetic, holographic, reflective, and informational elements on the surface areas that create the illusion of movement distinct from the rotation of the rotor itself in response to wind; wherein said surface areas include at least two vanes, and the elements comprise at least one of a plurality of discrete design or aesthetic elements disposed on different vanes to create a spiral movement illusion; and wherein in addition to the design or aesthetic elements informational elements, including at least one word, are provided, different portions of said at least one word provided on different vanes, and the entirety of said at least one word visible only during rotation of said rotor.

3. A rotor as recited in claim 2 wherein said rotating surface areas are surface areas of vanes of a Savonius vertical axis wind turbine having exactly three vanes.

4. A Savonius vertical axis wind turbine (VAWT) having a rotor with vanes having relatively large, uninterrupted exterior surface areas, and a plurality of messages on said surface areas each message primarily visible at a different speed of rotation of the vanes than said other messages in response to rotation by the wind.

5. A Savonius VAWT as recited in claim 4 wherein said rotor is a Savonius rotor having at least three vanes, and has at least three messages.

6. A wind turbine rotor operatively connected to a pump or generator to drive the pump or generator in response to wind, said rotor having at least two vanes rotatable in response to wind, each vane having an exterior surface area coverings for said exterior surface areas of said vanes, said coverings providing a vastly different appearance than the appearance of said vane exterior surface areas; and removable attachment elements for operatively removably connecting said coverings to said vane exterior surfaces, said removable attachment elements selected from the group consisting essentially of cooperating hook and loop fasteners on said coverings and said vane exterior surface areas, and cooperating permanent magnets or magnetic material on said coverings and said vane exterior surface areas: said rotor having at least three vanes; a plurality of messages on at least one of said surface areas and said coverings, each message primarily visible at a different speed of rotation of said vanes than said other messages in response to rotation by the wind.

7. A wind turbine rotor as recited in claim 6 wherein one of said coverings or vane exterior surface areas has a camouflage configuration and the other does not.

8. A functional wind turbine rotor operatively connected to a pump or generator to drive the pump or generator in response to wind, and having rotating surface areas; and at least one of design, aesthetic, holographic, reflective, and informational elements on the surface areas that create the illusion of movement distinct from the rotation of the rotor itself in response to wind; and wherein said rotor comprises a Savonius rotor with vanes having relatively large, uninterrupted, exterior surface areas; and a plurality of messages on the surface areas each message primarily visible at a different speed of rotation of the vanes than the other messages in response to rotation by the wind.

* * * * *